Feb. 12, 1935. J. S. SHARPE 1,991,124
MECHANICAL TRANSMISSION MECHANISM
Filed July 13, 1933 8 Sheets-Sheet 2

Inventor:
John S. Sharpe
by his Attorneys
Howson & Howson

Feb. 12, 1935.  J. S. SHARPE  1,991,124
MECHANICAL TRANSMISSION MECHANISM
Filed July 13, 1933   8 Sheets-Sheet 4

Inventor:
John S. Sharpe
by his Attorneys
Howson & Howson

Inventor:-
John S. Sharpe
by his Attorneys
Howson & Howson

Feb. 12, 1935. J. S. SHARPE 1,991,124
MECHANICAL TRANSMISSION MECHANISM
Filed July 13, 1933 8 Sheets-Sheet 8

Inventor:
John S. Sharpe
by his Attorneys
Howson & Howson

Patented Feb. 12, 1935

1,991,124

UNITED STATES PATENT OFFICE 1,991,124

MECHANICAL TRANSMISSION MECHANISM

John S. Sharpe, Haverford, Pa.

Application July 13, 1933, Serial No. 680,303

6 Claims. (Cl. 74—262)

This invention relates to improvements in mechanical transmission mechanisms, and a principal object of the invention is to provide a novel, simple and efficient mechanism of the change-speed constant-mesh type.

Another object of the invention is to provide semi-automatic means for operating said mechanism.

Still another object of the invention is to provide a semi-automatic mechanism of the stated character having means for preselection of any desired speed-change.

The invention further resides in certain novel mechanical and operating features and characteristics hereinafter set forth and illustrated in the attached drawings, in which.

Figure 1:
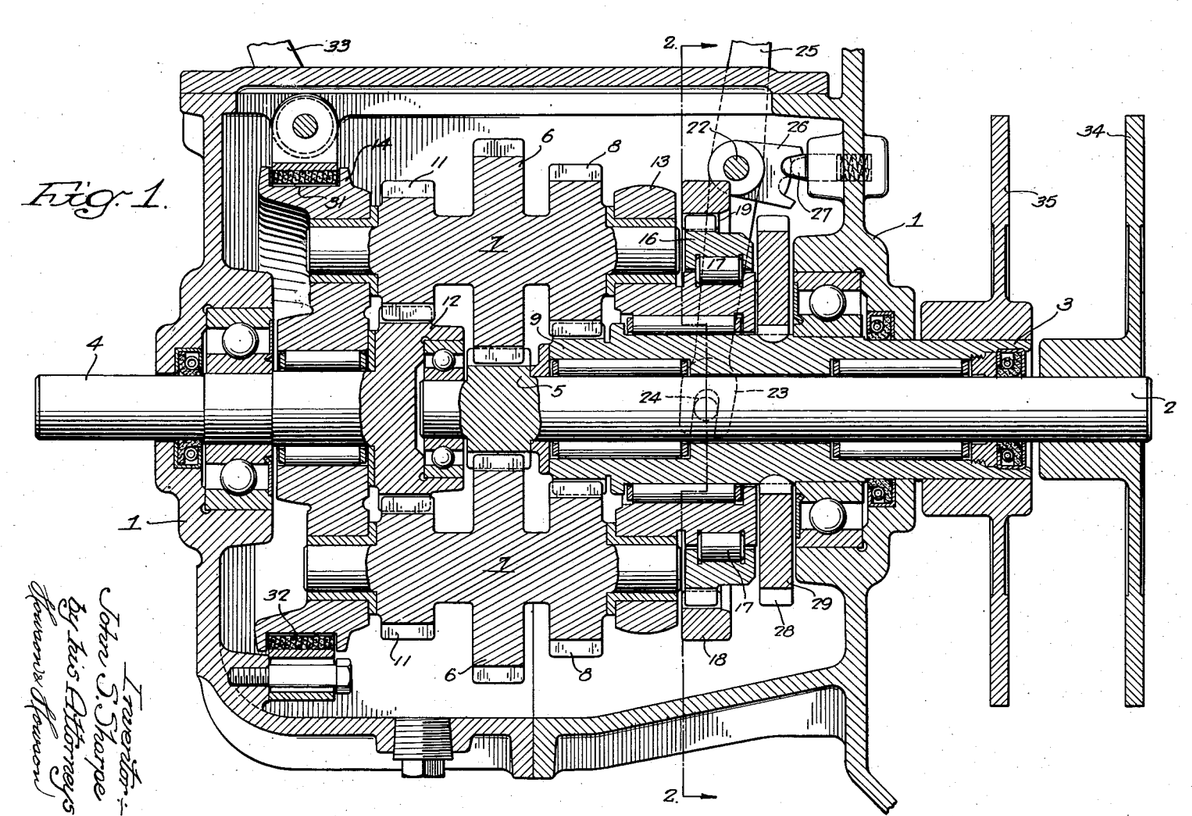
Figure 1 is a sectional view showing a mechanism made in accordance with my invention.
Figures 2, 3, 4:
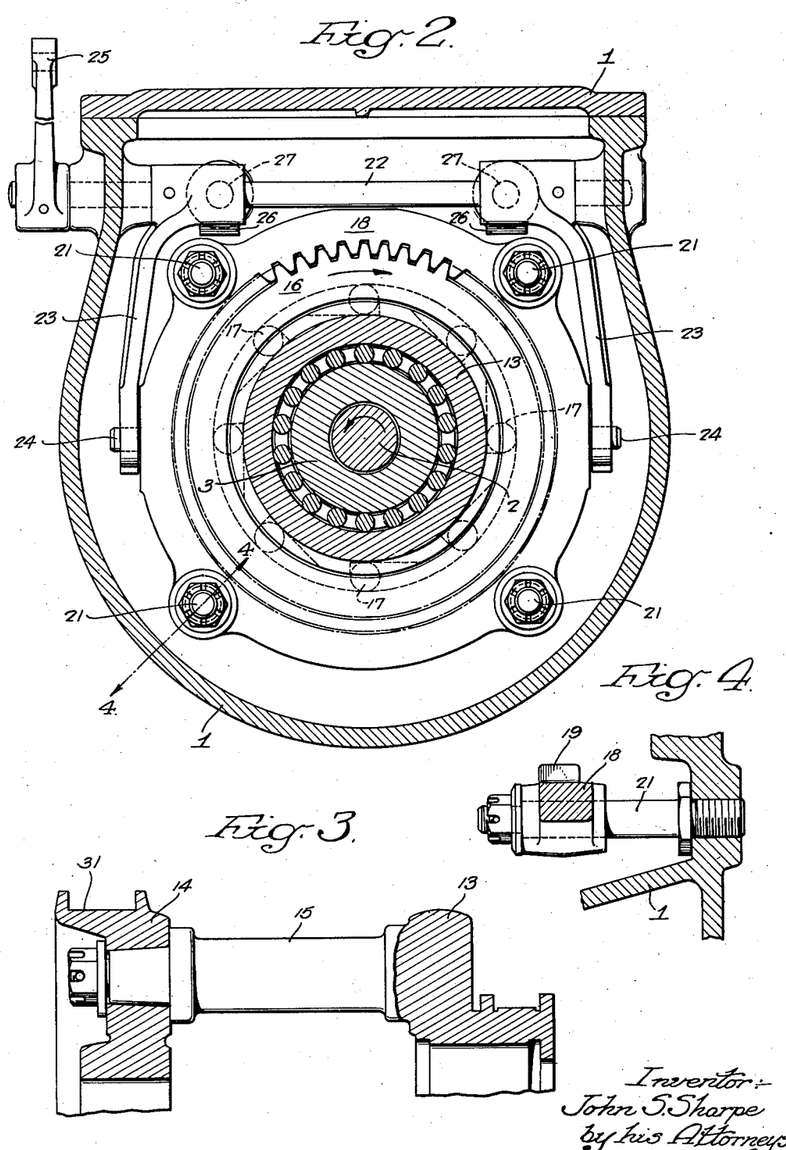
Fig. 2 is a section on the line 2—2, Fig. 1.
Fig. 3 is a fragmentary sectional view showing a detail of the mechanism.
Fig. 4 is a section on the line 4—4, Fig. 2.

With reference to Fig. 1 of the drawings, the transmission mechanism in a preferred embodiment comprises a relatively fixed casing 1 in which are journaled drive shafts 2 and 3 (through which power is applied to the mechanism) and a driven shaft 4. The shaft 2 carries at its inner end a pinion 5 which meshes with an intermediate gear 6 of a plurality of multiple-gear planetary elements 7. Each of the elements 7 also includes a gear 8 which meshes with a pinion 9 at the inner end of the shaft 3; and each of the elements 7 also includes a gear 11, which gears 11 mesh with a pinion 12 at the inner end of the driven shaft 4. The planetaries 7 are journaled at opposite ends in rotary spiders 13 and 14, which as shown in Fig. 3 are connected and relatively immobilized through the medium of studs 15. As shown in Fig. 1, the spider 13 is journaled upon the shaft 3, while the spider 14 is similarly journaled upon the shaft 4.

The spider 13 has journaled thereon a toothed ring 16, and this ring is permitted to turn with respect to the spider 13 in one direction only, rotation in the opposite direction being prevented by an overrunning clutch device of well known form comprising rollers 17 seated in tapered recesses in the periphery of the spider 13, see Figs. 1 and 2. Thus in Fig. 2, the ring 16 is free to rotate about the spider 13 only in the direction indicated by the arrow.

The ring 16 is embraced by a clutch element 18, which element has internal teeth 19 adapted to mesh with the teeth of the ring 16. The clutch element 18 as shown in Fig. 4 is slidably mounted upon studs 21 secured in and projecting from the casing 1, and adjustment of the clutch element 18 upon the guide studs 21 is effected through the medium, see Fig. 2, of a rock shaft 22 journaled in the casing 1 and having depending arms 23, the slotted lower ends of which embrace trunnion pins 24 at opposite sides of the said clutch element. The shaft 22 is actuated through the medium of a lever 25 secured to the said shaft 22 externally of the casing. Means is also provided for releasably retaining the rock shaft 22 and hence the clutch element 18 in either one of two alternative positions. This means comprises a pair of recessed dogs 26 secured to the shaft 22, see Figs. 1 and 2, operatively associated with spring-pressed detents 27 on the casing 1. The recesses in the dogs 26 are so relatively arranged that the dogs are respectively effective through the medium of the detents 27 to releasably retain the shaft in position, corresponding in one instance to the position of the clutch element 18 shown in Fig. 4, and in the other instance in a position at the inner end of the stud 21, in which latter position the said clutch element has been shifted from the position shown in Fig. 1 in which it engages the ring 16 to an alternative position similarly engaging the teeth 28 on the periphery of an element 29 suitably secured to the shaft 3. It will be apparent that the arrangement is such that in the alternative positions of the clutch 18 the latter acts to respectively immobilize the ring 16 and the member 29. The spider element 14 is provided in its peripheral surface with a cylindrical surface 31 constituting a brake drum, and with this drum is operatively associated a brake band 32 anchored to the casing 1 and operated through the medium of a lever 33 to grip and thereby immobilize the spider 14, or to release this spider for free rotation within the casing. Operatively associated with each of the shafts 2 and 3 is a clutch designated in Fig. 1, 34 and 35 respectively.

The operation of the aforedescribed mechanism is as follows: Assuming that power may be applied selectively to the mechanism through the clutches 34 and 35, engagement of the clutch 34, connecting the shaft 2 with the source of power, while the clutch 35 is disengaged, results in a rotation of the shaft 2 in the direction indicated by the arrow in Fig. 2 and of the planetary elements 7 through the pinion 5 and gear 6. This rotation of the planetaries 7 tends to cause the gear 11 to track around the gear 12 of the shaft 4. This tracking of the planetary 7, however, is prevented by the overruning clutch 17, which prevents the corresponding movement of the spider 13 through the medium of the ring 16 and the immobilizing clutch 18. It will be understood that during this operation, the shaft 3 is left free for rotation in either direction by release of the clutch 35. Since the spiders 13 and 14 of the planetaries 7 are prevented from turning as set forth, rotation of the planetaries through the pinion 5 imposes a turning torque through the gear 11 and pinion 12 upon the shaft 4. It will be noted that this torque is relatively high as compared to the torque imposed upon the shaft 2 by reason of the favorable leverages effected through the varying diameters of the pinions 5 and 12 and the gears 6 and 11. This constitutes the low gear relationship between the power source and the driven shaft 4 in which the transmitted speeds are relatively low and the torques relatively high.

When now the clutch 34 is released and the clutch 35 engaged, the shaft 2 is released and left free for rotation in either direction, while power is applied through the shaft 3 and pinion 9 to the gears 8 of the planetaries 7. As described above, the resulting rotation of the planetaries 7 cannot result in a tracking of the gears 11 on the pinion 12 by reason of the immobilization of the spider 13 in one direction by the overrunning clutch 17 acting through the immobilized ring 16. Rotation of the planetaries 7 about their individual axes accordingly imposes a turning torque upon the shaft 4 through the pinion 9, the planetary gears 8 and 11 and the pinion 12. By reason of the relative diameters of these interengaging pinions and gears, the speed relation of the driving shaft 3 and the driven shaft 4 differs from that previously existing between the driving shaft 2 and the driven shaft 4, the speed of rotation of the shaft 4 being increased, while the driving torque upon this shaft is relatively decreased. This corresponds to the second gear relation between the power source and the driven shaft 4.

Assuming now that the clutches 34 and 35 are both engaged, it will be apparent that by reason of the equal speed of rotation of the shafts 2 and 3 and the different diameters of the pinions 5 and 9 associated with these shafts and of the gears 6 and 8 of the planetaries 7, the shafts 2 and 3 and the planetaries 7 will be relatively locked so that this entire mechanism rotates as a unit together with the spiders 13 and 14 and the driven shaft 4. This, therefore, corresponds to the first gear relationship between the power source and the driven shaft 4, in which the speed and torque ratios of the driving and driven shafts are unity.

It will be apparent that the changes in the torque and speed relations of the driving and driven elements are effected solely through the manipulation of the clutches 34 and 35, and with no requirement for meshing any of the gears included in the transmission mechanism.

If it is desired to reverse the direction of rotation of the shaft 4, it is only necessary to shift the clutch element 18 through the medium of the lever 25 to its alternative position engaging the member 29, and thereafter engaging the clutch 34, the clutch 35 being disengaged. Engagement of the clutch element 18 with the member 29 effects an immobilization of the shaft 3 so that when power is applied to the mechanism through the shaft 2, the resultant rotation of the planetaries 7 through the medium of the pinion 5 and gear 6 will cause a tracking of the planetaries around the pinion 9 of the immobilized shaft 3. This tracking of the planetaries with the corresponding rotational movement of the spiders 13 and 14 is permitted by reason of the fact that the overrunning clutch 17 has been rendered inoperative by disengagement of the immobilizing clutch 18 from the ring 16. By reason of the differing relative diameters between the engaged pairs of gears 5 and 6 and 11 and 12, this movement of the planetaries 7 results in a corresponding rotation at a reduced speed of the shaft 4, and this rotation is in a direction reverse to the rotation of the shaft 4 when actuated under the conditions previously described.

If when the mechanism is operated under the high speed conditions it is desirable to change over to the second gear condition, in order for example to take advantage of the braking action of the motor on a down grade, it will be necessary after dialing not only to release the clutch 34 but also to apply the brake 31 which, as previously described, is accomplished through the lever 33. This has the effect of stopping rotation of the spiders and orbital rotation of the planetary element 7, which acts to reverse the second gear relation in the transmission so that the driven shaft may in effect drive the motor.

Figures 5, 11:
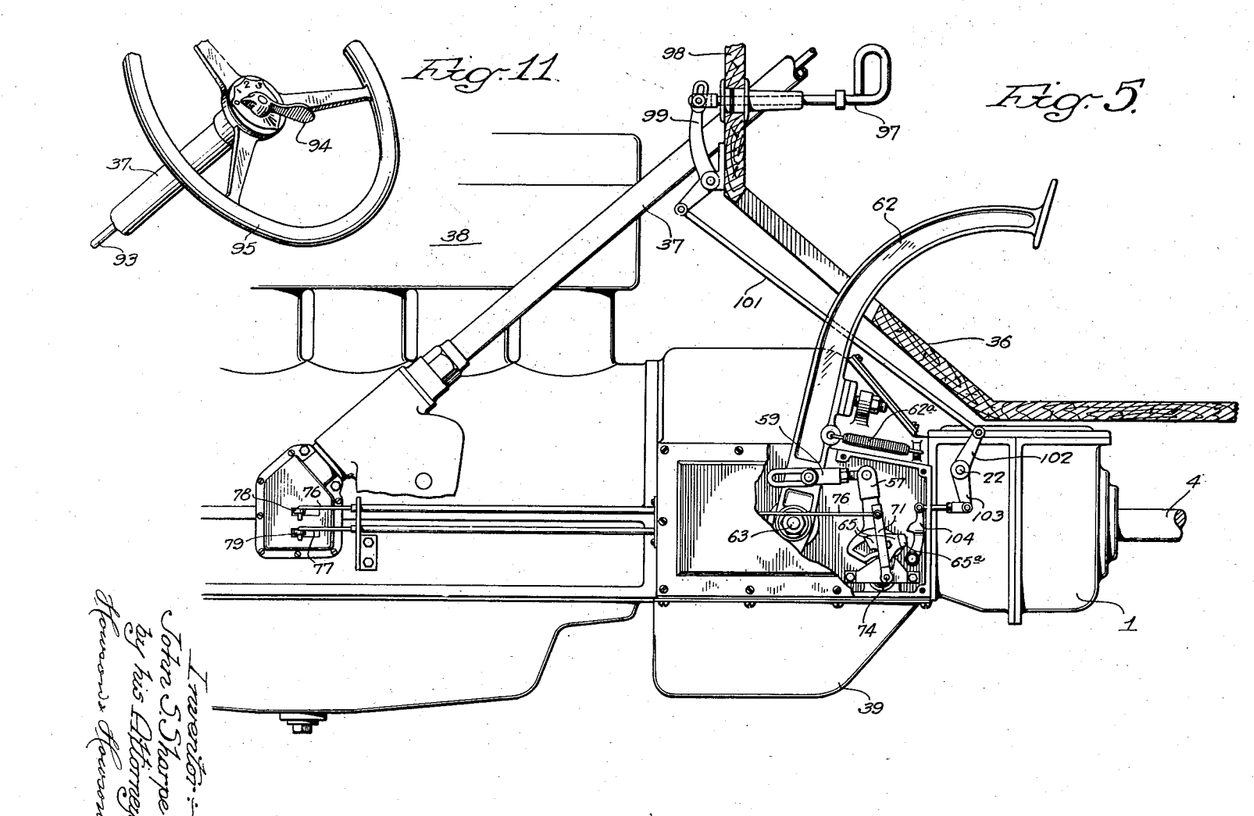
Fig. 5 is a diagrammatic side elevation and partial sectional view of the mechanism as applied to a motor vehicle.
Fig. 11 is a view in perspective of the steering wheel of the vehicle showing the selector device.
Figures 12, 13:
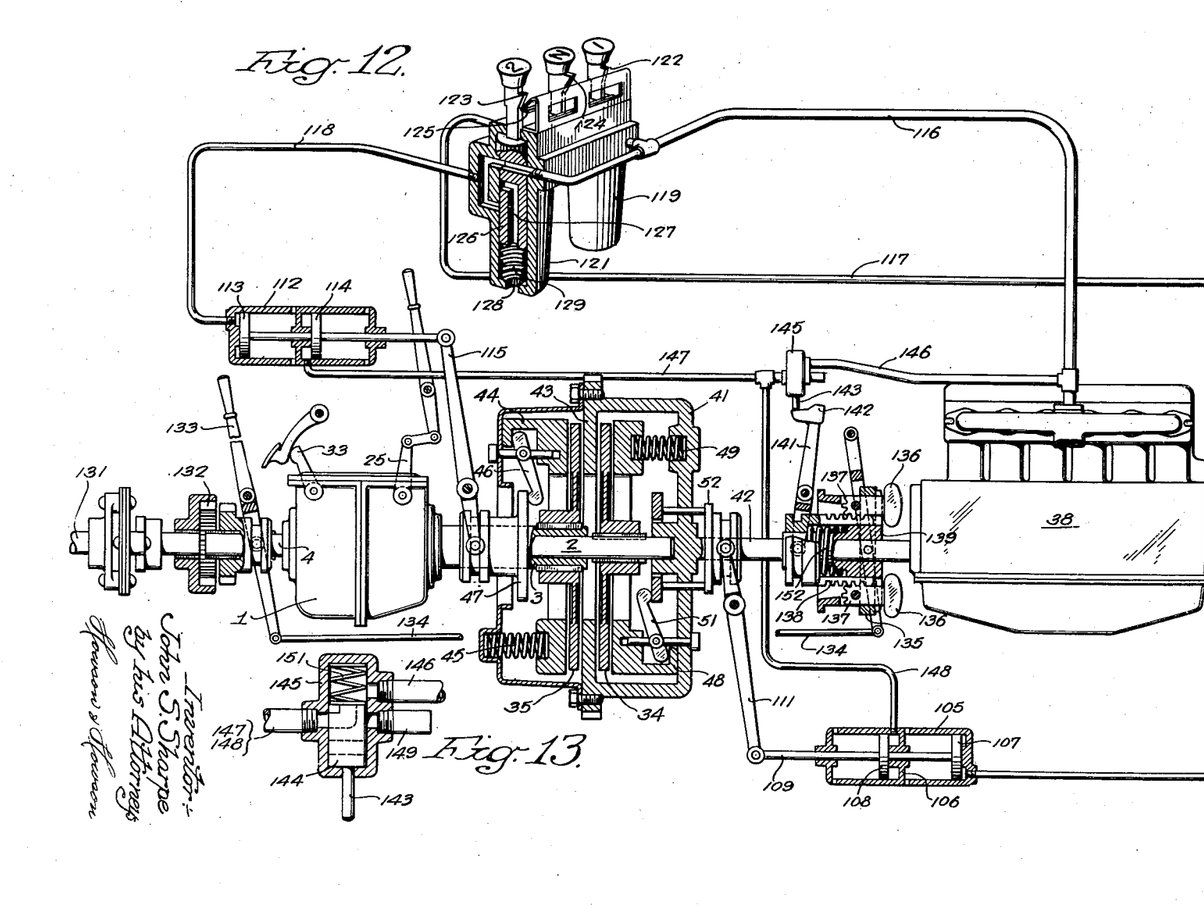
Fig. 12 is a diagrammatic view showing another method of control of the transmission mechanism as applied to a motor vehicle.
Fig. 13 is a sectional view of one of the elements of the mechanism shown in Fig. 12.

In Figs. 5 to 12, inclusive, I have illustrated a control apparatus for the aforedescribed transmission, suitable for motor vehicles. In Fig. 5, 36 is the floor of the motor vehicle, 37 the steering column, and the motor is indicated by the reference numeral 38. The transmission mechanism, previously described, is indicated by the reference numeral 1 and the clutches 34 and 35 are housed within a casing 39 intermediate the casing 1 and the engine 38. The clutch mechanism in more or less diagrammatic form is illustrated in Fig. 12 and as therein illustrated consists of a casing 41 mounted on and rotatable with the motor shaft 42. Into the opposite side of the casing project co-axially arranged and telescoping shafts corresponding to the drive shafts 2 and 3 illustrated in Fig. 1 and designated by the corresponding numbers. To these shafts are secured the clutch elements 34 and 35, the element 35 being positioned between an inwardly projecting flange 43 of the casing 41 and a clutch element 44 slidably mounted on said casing 41. Springs 45 confined between the casing and the outer face of the member 44 tend to force this member inwardly so as to clamp the clutch plate 35 between itself and the flange 43 of the casing 41, thereby establishing a driving connection between the motor shaft 42 and the shaft 3, to which the disk 35 is connected. The clutch element 44 may be retracted as shown in Fig. 12 through the medium of one or more levers 46 pivotally mounted on the casing 41 and actuated through the medium of a flanged collar 47 slidably mounted on the shaft 3. The clutch disk 34 may be similarly clamped to the casing 41 through the medium of a clutch member 48 corresponding to the clutch member 44. This member 48 is also actuated by springs 49 to clamp the disk 34 to the casing 41 and may be retracted through one or more levers 51 corresponding to the levers 46 previously described. The lever 51 is actuated by a flanged sleeve 52 slidably mounted on the shaft 42.

Figure 6:
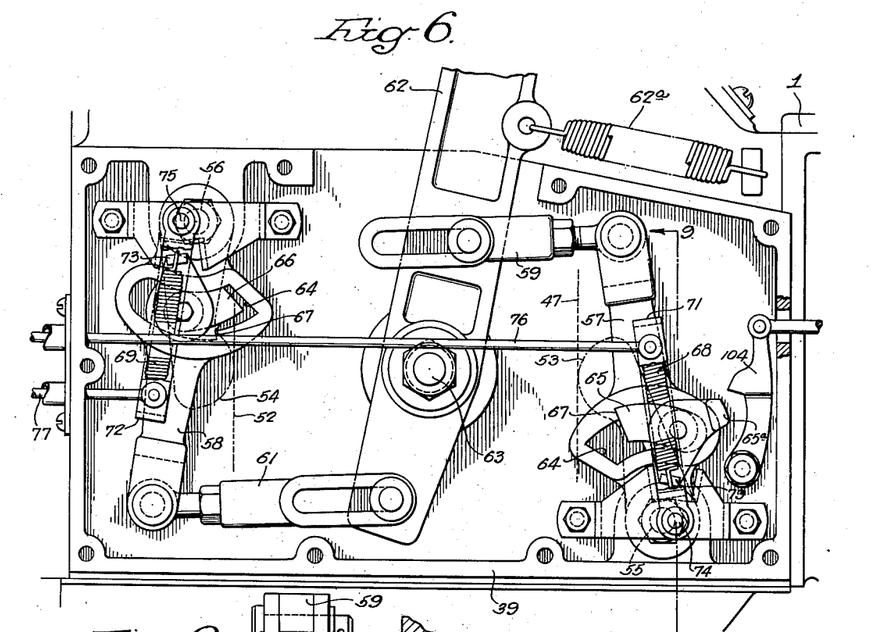
Fig. 6 is an enlarged fragmentary sectional view illustrating the control means of the motor vehicle application illustrated in Fig. 2.
Figures 9, 10:
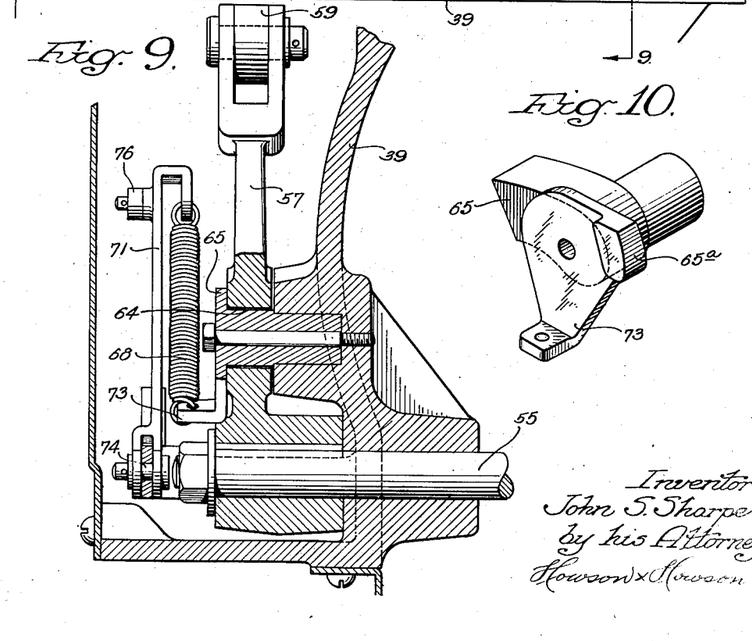
Fig. 9 is a section on the line 9—9, Fig. 6.
Fig. 10 is a view in perspective of one of the elements of the control mechanism shown in Figs. 6 and 9.

In the control mechanism illustrated in Figs. 5 to 11, inclusive, the sleeves 47 and 52 or their equivalents, which are shown in Fig. 6 in broken lines and designated by the same reference numerals, are operated by cam elements 53 and 54, respectively, which cams are carried by shafts 55 and 56 journaled in the side of the casing 39. The outer end of each of these shafts carries an arm 57 and 58, respectively, each of which is connected by a link 59 and 61, respectively, to a treadle 62 which is pivotally mounted at 63 on the casing 39 and which, as shown in Fig. 5, projects upwardly through a slotted opening in the floor board 36. Each of the levers 57 and 58 has an arcuate slotted opening 64, which slots are occupied respectively by detents 65 and 66, respectively, pivotally mounted in the casing 39 as shown in Fig. 9. One edge of the slot 64 in each of the arms 57 and 58 is provided with a notch 67 into which, under certain conditions, the detent is adapted to move to thereby retain the levers in a retracted position and the detents may be adjusted to and from positions to engage certain notches through the medium of springs 68 and 69, respectively, which springs are secured at one end to levers 71 and 72, respectively, and at the opposite ends to projecting arms 73 of the respective detents 65 and 66. Adjustment of the arms 71 and 72 about their pivots 74 and 75, respectively, has the effect of applying the spring pressure at opposite sides of the pivotal axis of the respective detents so that according to the position of the arms 71 and 72, the detents are either resiliently held by said springs in position engaging the notched edges of the slots 64 or in alternative positions against the opposite edges of the slots in which they are disengaged from the notches. These two positions of the detents are illustrated in Fig. 6, wherein the detent 66 is disengaged from the notch 67, whereas the detent 65 is in the alternative position engaging the notched edge of the slot 64.

Figure 7:
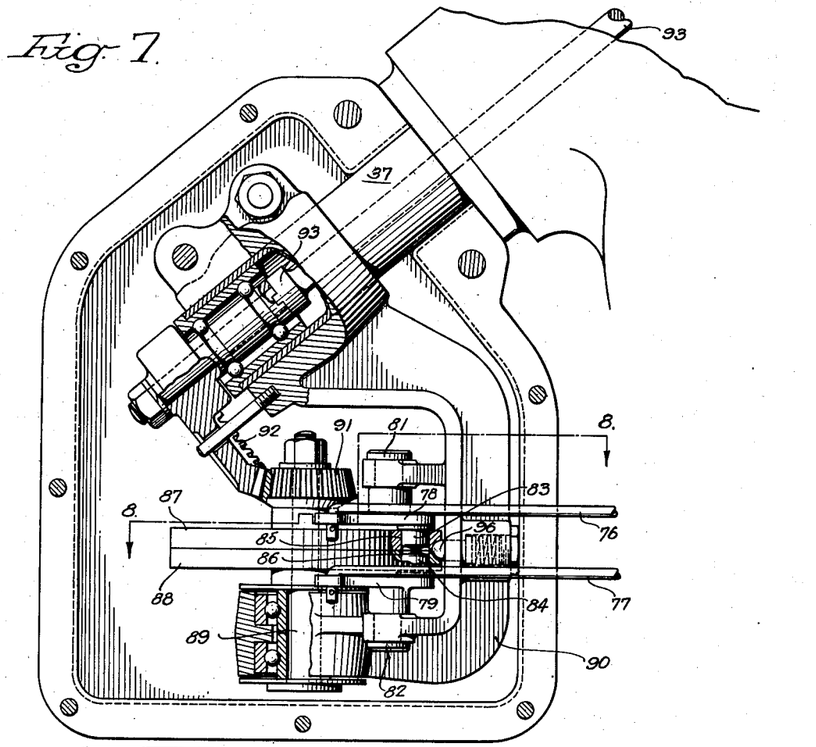
Fig. 7 is another fragmentary elevational and partial sectional view illustrating the details of the control mechanism.
Figure 8:
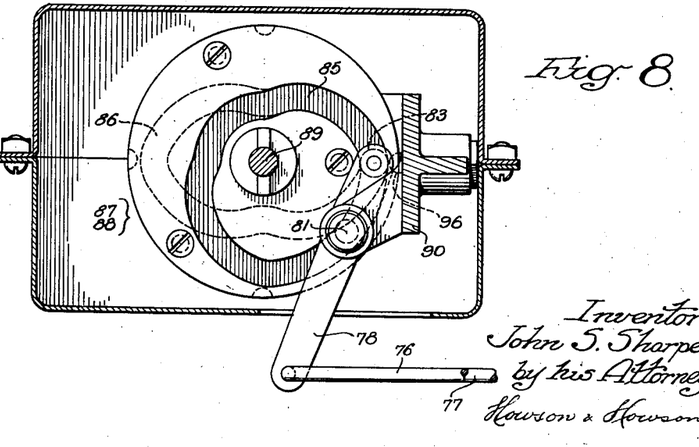
Fig. 8 is a section on the line 8—8, Fig. 7.

The arms 71 and 72 are adjusted on their pivots to the alternative position through the medium of rods 76 and 77 which, as shown in Figs. 5 and 7, are connected at their opposite ends to levers 78 and 79, which are pivotally mounted at 81 and 82, respectively, to a fixed bracket 90 depending from the lower end of the steering column 37. Each of the levers 78 and 79 carries a cam roller 83 and 84, respectively, which fit into the grooves 85 and 86 of a pair of cams 87 and 88 and a vertical spindle 89 also journaled in the bracket 90. The upper end of the spindle 89 carries a beveled pinion 91 which meshes with a supplemental gear 92 fixed to the lower end of a rod 93 extending longitudinally through and journaled in the steering column 37 and terminating at its upper end in a lever 94 at the center of the steering wheel 95, see Fig. 11. Rotation of the rod 93 through the lever 94 effects a corresponding rotation of the segmental gear 92 and through the beveled pinion of the cams 87 and 88. As shown in Fig. 11, four positions of the rod 93, designated respectively, 0, 1, 2 and 3, are indicated at the top of the steering column in relation to the lever 94, so that the rod 93 may be accurately adjusted to any one of these four positions. In the corresponding positions of the cams 87 and 88, spring-pressed detents 96 in the bracket 90 enter recesses in the peripheral surface of the said cams and thereby resiliently and releasably retain said cams in the various positions of adjustment corresponding to the positions of the rod 93 designated as previously set forth at the top of the steering column.

In the construction described, the springs 68 and 69 must necessarily exert their pressures at one side or other of the pivotal axes of the detents 65 and 66, regardless of the exact position of the selector lever 94 so that the operativeness of the device does not depend on exactly accurate adjustments of the said lever. It will be noted that the selector lever 94 may be adjusted to any preselected position regardless of and in any position of the clutch pedal 62; and also that the clutches in each instance are allowed to engage only by a retractive movement of the said pedal corresponding to the action of the present standard clutch mechanisms.

With further reference to Fig. 6, the parts as therein illustrated are arranged to correspond to the low gear relation of the transmission mechanism in which as previously set forth the clutch 34 is engaged and the clutch 35 released. Also in this position the clutch element 18 engages and immobilizes the ring 16. The lever 58 which as previously described controls the clutch 34 is disengaged by the detent 66 and is thereby permitted to move under the action of the clutch springs 49 into the position illustrated, the clutch being engaged. At the same time, the lever 57 which controls the clutch 35 is engaged by the detent 65 and is retained by this detent against the pressure of the clutch springs 45 in a position wherein the clutch is maintained in the disengaged condition through the medium of the levers 46. The treadle 62 is held by its spring 62a in the retracted position as shown. In this relative position of the parts, the lever 94 would normally point to the numeral 1. If now it is desired to shift to second or intermediate gear relation, the lever 94 is adjusted to point towards the numeral 2, which has the effect through the rod 93 and associated elements including the rods 76 and 77 of swinging both of the arms 71 and 72 into the alternative positions wherein the spring 68 exerts a pressure tending to retract the detent 65 from the notch 67, and the tension of the spring 69 causes an adjustment of the detent 66 to the opposite side of the recess 64 in position to enter the notch 67. A subsequent advance movement of the treadle 62 causes a movement of the lever 58 to the right, Fig. 6, disengaging the clutch 34 and permitting the detent 66 to enter the notch whereby the clutch is held in the released position. Continued movement of the treadle 62 eventually advances the lever 57 to the left sufficiently to permit the spring 68 to swing the detent 65 clear of the notch 67, so that when the treadle 62 is released, the arm 57 may swing to the right, see Fig. 6, which has the effect of permitting engagement through its springs 45 of the clutch 35.

If now it is desired to adjust the transmission to the high speed or gear relation, the lever 94 is again turned until it points to the numeral 3. The resultant additional rocking of the rod 93 effects a readjustment through the associated cam mechanism of the lever 72 to its original position as shown in Fig. 6 whereby the spring 69 exerts a pressure tending to withdraw the detent 66 from the notch 67. The lever 71 in this instance is left in the position to which it was previously adjusted in which the pressure of the spring 68 holds the detent 65 in the retracted position. If now the treadle 62 is again moved forward, the lever 58 will be moved sufficiently to release the detent 66, which is retracted so that when the treadle 62 is permitted to return to its normal position, the lever 58 will be permitted to move under the pressure of the clutch springs 49 into the position shown in Fig. 6 in which the clutch 34 is again engaged. Under these circumstances, the clutches 34 and 35 both being engaged, the transmission is in the high speed or gear relation in which the speed and torque ratios of the driving and driven elements of the transmission are unity.

Adjustment of the lever 94 to the position in which it is shown in Fig. 11 pointing to 0 on the associated scale causes an adjustment of the levers 71 and 72 such that when the treadle 62 is first advanced and then permitted to return to its normal position, both of the clutches 34 and 35 are disengaged and are so maintained.

Reversal of the direction of rotation of the driven shaft is effected as previously set forth by adjustment through the lever 25 of the clutch element 18 into engagement with the member 29. This is effected in the embodiment under discussion by advancing a rod 97 slidably guided in the dash 98 of the vehicle. This movement of the rod 97 rocks a bell crank lever 99 and advances a connecting rod 101 which is connected through a lever 102 with the shaft 22. This also has the effect through a projecting arm 103 of the lever 102 of rocking a detent element 104 pivotally mounted on the casing 39 from the retracted position in which it is shown in Figs. 5 and 6 to an advanced position overlying the rearwardly projecting portion 65a of the detent 65. When the detent 104 is so advanced, it prevents the detent 65 from shifting from the notch-engaging position, in which it is shown in Fig. 6, to the alternative position, and thereby prevents engagement of the clutch 35. Normally, the lever 94 for the reverse action will be shifted to the low gear position in which it points to the numeral 1 on the scale, but if accidentally this lever 94 is shifted to the second gear or intermediate position, it will have no effect as normally to engage the clutch 35 by reason of the action of the detent 104 previously described, so that the effect will be the same as though the lever 94 were adjusted to the neutral position, since the clutch 34 is also disengaged. If the lever 94 is thrown into the high speed position pointing to the numeral 3, the effect by reason of the action of the detent 104 preventing engagement of the clutch 35 will be the same as though the lever 94 were adjusted to the low gear position. In this manner, it is impossible to operate the reverse movement except in the low gear relation of the transmission mechanism. It will be noted, further, that the relation of the detent 104 to the detent 65 is such that when the latter is in the retracted position, it prevents the detent 104 from being advanced into its operative position and thereby precludes operation of the reverse mechanism as long as the clutch 35, which controls the intermediate and high gear positions of the transmission, is engaged. Further, in order to reverse the transmission, it must be in the neutral position and the vehicle standing still.

It will be apparent from the foregoing description that adjustment of the transmission for varying the speed and torque relations of the driving and driven elements may be effected by a simple adjustment of the lever 94 and a subsequent advance movement and release of the treadle 62.

In Fig. 12, I have illustrated a means for semi-automatic operation of the transmission mechanism by means of the well known vacuum cylinder. In this instance, the control is effected entirely by pressure of a series of buttons labeled, respectively, 1, 2 and N, corresponding respectively to low gear, second gear and intermediate adjustments of the transmission mechanism. Simultaneous depression of the buttons designated 1 and 2 will as previously set forth result in an adjustment of the transmission mechanism to a unity torque and speed relation. In this instance, the clutch 34 is actuated through the medium of a cylinder 105, this cylinder having two working chambers separated by a partition 106 and interconnected pistons 107 and 108 which operate in the respective working chambers. Both pistons are connected to a common rod 109 which in turn is connected to the lower end of a lever 111 which is operatively connected to the flanged sleeve 52 which controls the clutch element 48 of the clutch 34. A similar cylinder and piston assembly 112—113—114 is connected to a lever 115 operatively associated with the flanged sleeve 47 controlling the clutch element 44 of the clutch 35. When the buttons 1 and 2 are in the elevated positions as illustrated, suction is applied through the pipes 116 and pipes 117 and 118 to the outer ends of the cylinders 105 and 112 which causes a retraction of the pistons of said cylinders into the positions shown in Fig. 12. In these positions, the sleeves 52 and 47 are advanced and the clutches 34 and 35 are disengaged as illustrated. Depression of the button labeled 1 through the action of the associated valve 119 disconnects the pipe 117 from the suction pipe 116 and connects the pipe 117 with the atmosphere whereby the pistons 107 and 108 are released from the suction and are permitted to advance to the opposite ends of the cylinders under the action of the clutch springs 49 whereby the clutch 34 is engaged.

Subsequent pressure of the button labeled 2 automatically releases the button 1 and permits it to return under spring action to its original position, and also through the associated valve 121 which corresponds to the valve 119 breaks the connection between the suction pipe 116 and the pipe 118, and connects the latter pipe to exhaust. Under these circumstances, the pistons 113 and 114 are released and are permitted to move to the opposite ends of their cylinder chambers under action of the clutch springs 45 whereby the clutch 35 is permitted to engage. Since the button 1, however, has been released automatically by depression of the button 2, it will be apparent that the suction in the pipe 116 is again effective through the pipe 117 to retract the pistons 107 and 108 to their original positions in which they are shown in the drawings, thereby disengaging the clutch 34.

The automatic release of the button 1 by depression of the button 2 is effected in the following manner: Each of the buttons 1 and 2 carries a shoulder 122 and 123 respectively, which when the buttons are depressed engage under a resilient detent element 125 whereby the buttons are retained for the time being in the depressed position. The shoulder 123 is slightly longer or projects slightly further from the stem of the button 2 than does the shoulder 122 of the button 1, so that when with the button 1 in the depressed position the button 2 is also depressed, the detent 125 is flexed backwardly sufficiently far in permitting passage of the shoulder 123 to free the shoulder 122 and thereby permit the button 1 to elevate to its original position. The shoulder 124 of the button labeled N is wider than either of the shoulders 122 and 123, and is further so arranged that while it engages and flexes the detent 125 away from its normal position, it never passes under the detent and is never, therefore, retained by said detent in the depressed position. The function of this button, therefore, is merely to release the buttons 1 and 2 from the detent 125 to permit these buttons to elevate to their normal positions.

The construction of the valves 119 and 121 is also shown in Fig. 12 by the sectional view through the valve 121. The stem of the button 2 is connected to an interior sliding valve element 126, which when the button is elevated as illustrated affords a connection between the pipe 116 and the pipe 118. When the button is depressed, however, this connection is broken by the solid wall of the valve 126, while a passage 127 extending longitudinally of the valve and through the wall thereof is brought into communication with the pipe 118 and thereby connects this pipe to an exhaust port 128 in the bottom of the valve casing. A spring 129 in the bottom of the casing tends to maintain the valve element 126 and hence the associated button in the elevated position.

It will be apparent that with the foregoing device simultaneous depression of the buttons 1 and 2 will effect a release of the pistons of both cylinders and a subsequent engagement of both clutches 34 and 35 for the high speed relation of the transmission. Both buttons are released for return to the neutral position by depression of the button N. Reversal of the direction of rotation of the driven shaft is effected in this case and as previously described through the lever 25, while the brake 31 of the transmission mechanism is operated through the lever 33.

Since in this case, release of the clutches 34 and 35 is dependent upon the operation of the motor 38, it is necessary, in order to start the motor, to provide means for disconnecting the drive shaft 4 of the transmission mechanism from the propeller shaft 131 of the motor vehicle. This is effected through a dog clutch 132 controlled through a lever 133. This lever is connected at its lower end through a rod 134 with the locking sleeve 135 of a governor mechanism consisting of a pair of pivoted weighted arms 136 which carry pinions 137 meshing with a racked sleeve 138 slidably mounted on a member 139 fixed to the shaft 42. This member 139 also carries the weighted arms 36. The outer end of the sleeve 138 has a circumferential groove through which the sleeve is operatively connected with a fixed pivoted lever 141, and the outer end of this lever carries a cam element 142 which is operatively associated through a depending stem 143 with the adjustable valve element 144 of a valve 145, see Fig. 13. This valve controls the connection between a suction pipe 146 connected with the pipe 116 and pipes 147 and 148 extending respectively to the outer ends of the inner cylinder chambers of the cylinders 105 and 112, which chambers respectively contain the pistons 108 and 114. When the valve element 144, as shown in Figs. 12 and 13, is in the depressed condition, communication is established between the suction pipe 146 and the pipes 147 and 148, but when the valve element 144 is elevated, the suction pipe 146 is disconnected from the pipes 147 and 148, and the latter pipes are connected with an exhaust port 149. A spring 151 in the upper end of the valve casing 145 tends to hold the valve element 144 in the depressed position, but when the upper end of the lever 141 is swung to the left, see Fig. 12, the cam 142 elevates the valve element 144 with the results previously set forth. A spring 152 tends to hold the sleeve 138 in the position shown in Fig. 12, in which the cam 142 is in the retracted position. When the dog clutch 132 is disengaged as illustrated, the sleeve 135 is advanced over the weighted arms 136 as illustrated, and thereby prevents these arms from swinging outwardly on their pivots by centrifugal action. Under these circumstances, therefore, the parts being as illustrated in Fig. 12, operation of the engine while having no effect upon the particular shaft 131 and regardless of the position of the control buttons 1 and 2 causes a suction on the inner chambers of the cylinders 105 and 112, effecting a retraction of the pistons and a disengagement of the clutches 34 and 35. When the dog clutch 132 is engaged, however, the locking sleeve 135 is retracted and permits the arms 136 to swing outwardly, thereby shifting the sleeve 138 to the right against the pressure of the spring 152 and causing the cam 142 to force the valve element 144 upwardly in its casing to thereby disconnect the suction pipe 146 from the pipes 147 and 148, and connecting these last-named pipes to the exhaust 149. The operation of the mechanism is now entirely under the control of the control buttons previously described.

In Figs. 14 to 18, inclusive, I have illustrated a further method of control by means of vacuum cylinders wherein the control buttons previously described are replaced by a simple lever operating after the manner of the present generally employed gear shift lever for motor vehicles and wherein the operation of the vacuum cylinders is controlled by a series of valves which in turn are actuated by cams operatively associated with the actuating lever.

Figures 15, 16:
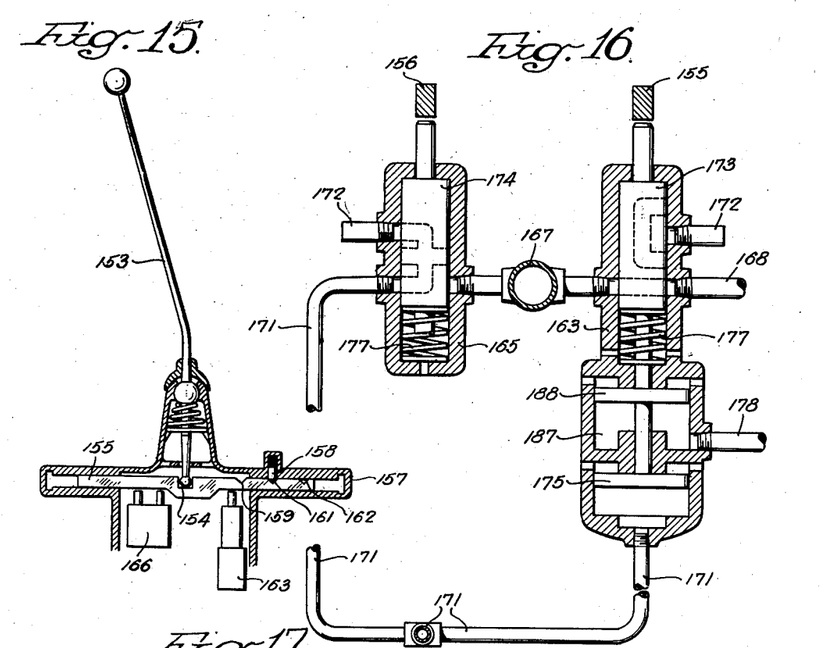
Fig. 15 is a fragmentary sectional view showing the manual operating means for the control system illustrated in Fig. 14.
Fig. 16 is a sectional view on the line 16—16, Fig. 14.

In Fig. 15, the actuating lever 153 is of the swivel type and is adapted to engage at its lower end in notches 154 of a pair of longitudinally slidable parallel cam elements 155 and 156. These cams are slidably mounted in a suitable casing 157 and are individually adjustable through the medium of the lever 153 to and from three positions determined by a spring-pressed detent 158 and three notches 159—161—162 engaged by this detent. In Fig. 15, the cam 155 is shown in the intermediate or neutral position in which the detent 158 engages the recess 161.

Figure 14:
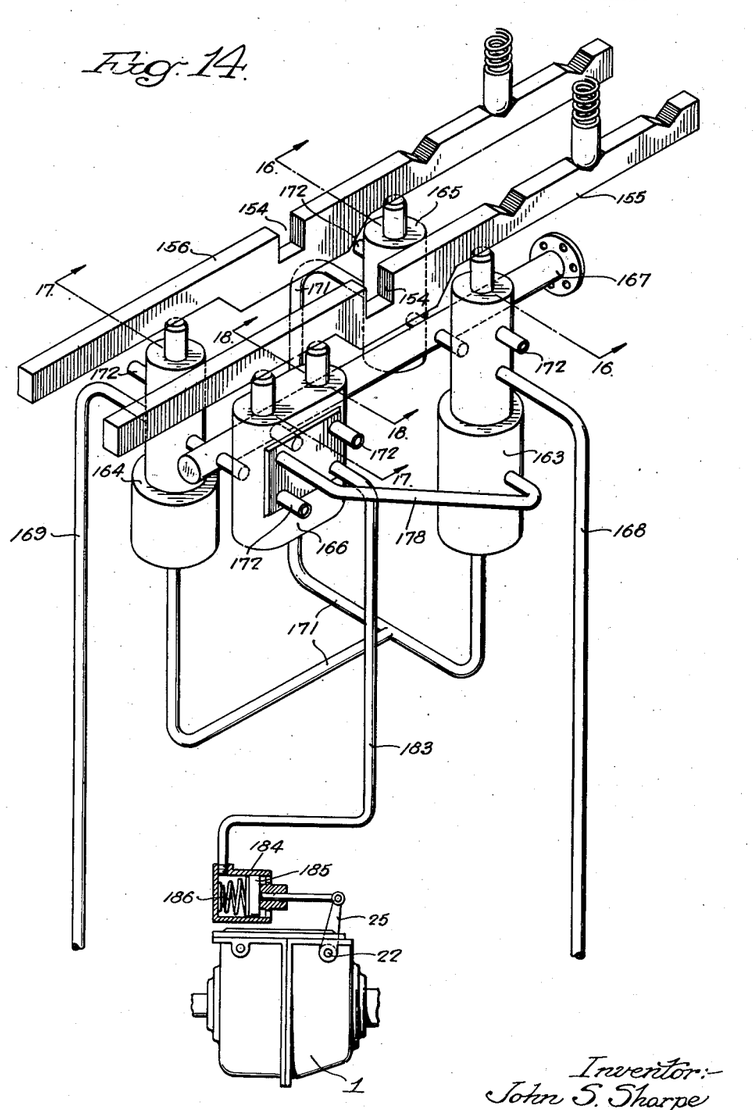
Fig. 14 is a diagrammatic view in perspective showing another system of control for the transmission mechanism.

Operatively associated with the sliding cams 155 and 156 are a series of valves designated generally in Fig. 14 by the reference numerals 163—164—165—166. Extending intermediate the valves of the two groups is a vacuum manifold 167 connected to the intake manifold of the motor, as previously set forth, and this manifold is connected by branches to the respective valves. The valve 163 is connected through a pipe 168 to a vacuum cylinder corresponding to that previously described controlling the clutch 34, while the valve 164 is connected through a pipe 169 with the vacuum cylinder controlling the clutch 35. A pipe 171 connects the valve 165 with both of the valves 163 and 164. Each of the valves 163, 164, 165 and 166 has an exhaust port 172 communicating with the atmosphere.

Figure 17:
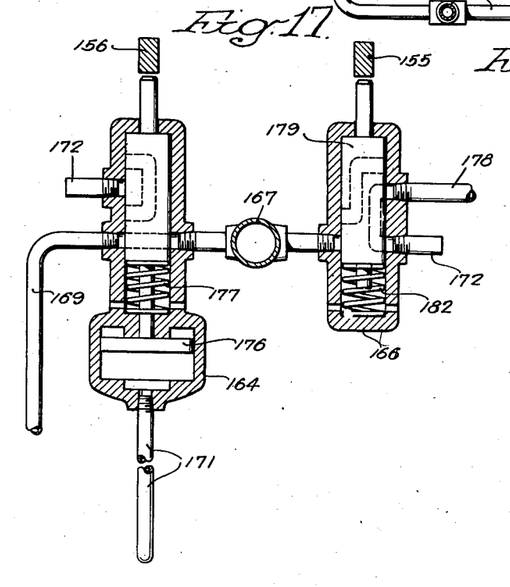
Fig. 17 is a sectional view on the line 17—17, Fig. 14.
Figure 18:
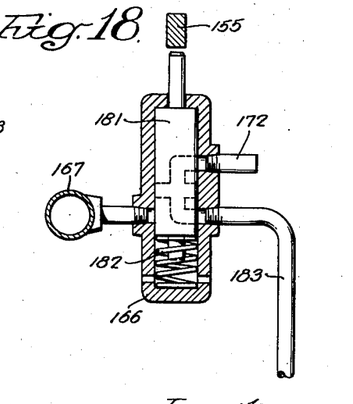
Fig. 18 is a sectional view on the line 18—18, Fig. 14.

Normally and as shown in Figs. 16, 17 and 18, the pipes 168 and 169 are connected through the valves 163 and 164 with the vacuum manifold whereby the control cylinders with which these pipes are connected are actuated to disengage the clutches 34 and 35. When the valve element 173 of the valve 163 is depressed through the action of the cam 155, the pipe 168 is disconnected from the manifold and is connected to exhaust through the pipe 172, with the result that the vacuum in the cylinder controlling the clutch 34 is released and that clutch is permitted to close. When the lever 153 is now actuated to bring the cam 156 into engagement with the stem of the valve 164, which incidentally cannot be accomplished until the cam 155 has been returned to the neutral position, the clutch 34 is again disengaged while the pipe 169 is disconnected from the vacuum manifold and is connected to the atmosphere through the exhaust pipe 172, thereby permitting closing of the valve in well known manner. It will be understood that when the clutch 34 is engaged while the clutch 35 is open, the transmission mechanism is in the low gear position, while when the clutch 34 is disengaged and the clutch 35 engaged, the second gear relation in the transmission mechanism prevails. If now the cam 156 is actuated to depress the valve element 174 of the valve 165, the pipe 171 which previously has been connected to the atmosphere through the pipe 172 is connected to the vacuum manifold 167, with the result that pistons 175 and 176 which operate in cylinders at the bottom of the valves 163 and 164 respectively and which pistons are connected to the valve elements of these valves, are drawn downwardly, thereby depressing the said valve elements and connecting the pipes 168 and 169 to atmosphere, with the result that the vacuum is released from both of the control cylinders, permitting engagement of both the clutches 34 and 35, and thereby adjusting the transmission mechanism to the direct drive or unity speed and torque relation. It will be noted that each of the valves discussed above is provided with a spring 177 which tends to maintain the valve elements in the elevated positions in which they are respectively shown in Figs. 16 and 17.

The valve 163 is connected through a pipe 178 with the valve 166. The valve 166 is a duplex valve containing two valve cylinders in which operate the valve elements 179 and 181 respectively, see Figs. 17 and 18. Each of the cylinders is provided with a spring 182 which tends to hold these elements in the elevated position in which they are illustrated. The pipe 178 connects to that one of the valve sections which contains the valve element 179. The other one of the valve sections containing the element 181 is connected through a pipe 183 with a vacuum cylinder 184 containing a piston 185 connected with the reverse lever 25 of the transmission mechanism. A spring 186 tends to hold the piston in the position shown in Fig. 14, in which the lever 25 is held in the position in which the clutch element 18 is interlocked with the ring 16 of the transmission mechanism. When the cam 155 is adjusted into the reverse position, it initially engages and depresses the valve element 181, and thereby disconnects the pipe 183 from atmosphere and connects it to the vacuum manifold 167. This results in a retraction of the piston 185 in the cylinder 184 and an adjustment of the clutch element 18 into engagement with the element 29 of the transmission mechanism. The cam 155 now engages and depresses the valve element 179, with the result that the pipe 178, which previously was connected to the atmosphere, is connected to the vacuum manifold 167. This pipe 178, as shown in Fig. 16, extends to the lower end of a vacuum cylinder 187 at the lower end of the valve 163, in which operates a piston 188 connected to the valve element 173. When suction is imposed upon the cylinder 187, the piston 188 is drawn downwardly, thereby disconnecting the pipe 168 from the vacuum manifold and connecting it with exhaust. This pipe as previously described controls the vacuum cylinder, which in turn controls the clutch 34, and when this cylinder is exhausted, the clutch 34 is permitted to engage whereby the reverse rotation of the driven shaft is effected. Restoration of both of the cam elements 155 and 156 to the neutral position effects a disengagement of both the clutches 34 and 35.

It will be apparent that there may be other modes of control without departure from the invention.

I claim:

1. In a transmission, a planetary mechanism comprising a planetary element, a driven member and a plurality of driving elements operatively associated with said element, said member and elements being coaxial with the orbital axis of the planetary and said driving elements being adapted individually to drive the planetary at different rates, selective means for individually and collectively connecting said driving elements with a source of power, said elements when actuated collectively effecting a rotation of the entire planetary mechanism as a unit, means for preventing a reverse orbital rotation of the planetary, said means being releasable, means operative when said preventing means is released for immobilizing one of the driving elements to constitute a fulcrum for driving the driven member in a reverse direction, and means for preventing operation of said reversing means while one of said driving elements is connected to the source of power.

2. In a transmission, a planetary mechanism comprising a planetary element, a plurality of elements coaxial with the orbital axis of said planetary and having independent driving connections with said planetary, said elements being adapted independently to drive said planetary at different rates, a clutch operatively associated with each of said driving elements, and means for independently and collectively operating said clutches, said means including a disengagement member common to said clutches, means associated with each clutch for retaining the clutch disengaged independently of said member, and means for selectively adjusting each of said retaining means into alternative positions in which it is respectively operative and inoperative to retain the associated clutch disengaged following a subsequent operation of said disengagement member, said adjusting means including resilient actuators for said retaining means and manually-actuated means for selectively operating said resilient actuators.

3. In a transmission, the combination with a driven member, of a plurality of driving members, a planetary mechanism operatively connecting each of the driving members with the driven member, said mechanisms being constructed and arranged to afford differing speed and torque ratios between the respective driving members and the driven member, means including a clutch associated with each driving member for selectively actuating the driving members and for collectively actuating said members, said planetary mechanisms when collectively actuated affording a direct drive connection between the driving members and the driven member, said selective actuating means including a clutch-disengaging member common to both of said clutches, means associated with each clutch for retaining the clutch disengaged independently of said member, and means for selectively adjusting each of said retaining means into alternative positions in which it is respectively operative and inoperative to retain the associated clutch disengaged following a subsequent operation of said disengagement member, said adjusting means including resilient actuators for said retaining means and manually-actuated means for selectively operating said resilient actuators.

4. In a variable transmission, the combination with a plurality of clutches, of a common clutch-actuating member, means for operatively connecting said member with each of said clutches, each of said connecting means comprising an adjustable detent, resilient means for retaining each of said detents in alternative positions in which the detent is respectively operative and inoperative to complete the connection between the associated clutch and the clutch-actuating member, and means for adjusting said resilient means to actuate the detents into the respective alternative positions.

5. In a variable transmission, the combination with a plurality of clutches, of a common clutch-actuating member, and means for operatively connecting said member with each of said clutches, each of said connecting means comprising a pivotally mounted arm operatively associated with the clutch and having a lost motion connection with said clutch-actuating member, a detent for retaining said arm in an adjusted position in which said clutch is released, and means for adjusting said detent to alternative positions in which the detent is respectively operative and inoperative with respect to the arm and for resiliently retaining said detent in the adjusted positions, said adjusting and retaining means being operative independently of the adjusted position of the arm to thereby permit a preselective adjustment of the detent in advance of the adjustment of said arm into the clutch-releasing or clutch-engaging positions.

6. In a variable transmission, the combination with a plurality of clutches, of a common clutch-actuating member, means for operatively connecting said member with each of said clutches, each of said connecting means comprising a clutch-actuating arm having a lost motion connection with said actuating member, and a detent associated with said arm and operative in alternative positions to retain the arm in the clutch release position and to permit return of said arm to the clutch-engaging position, and means for adjusting said detent including resilient means for urging the detent toward the said alternative positions.

JOHN S. SHARPE.